(12) United States Patent
Moore et al.

(10) Patent No.: US 7,558,053 B2
(45) Date of Patent: Jul. 7, 2009

(54) ELECTRICAL ENCLOSURE AND ELECTRICAL BUS ASSEMBLY THEREFOR

(75) Inventors: Stanley E. Moore, Weaverville, NC (US); Amy W. Rowell, Asheville, NC (US); Michael H. Abrahamsen, Hendersonville, NC (US)

(73) Assignee: Eaton Corporation, Cleveland, OH (US)

( * ) Notice: Subject to any disclaimer, the term of this patent is extended or adjusted under 35 U.S.C. 154(b) by 69 days.

(21) Appl. No.: 11/936,348

(22) Filed: Nov. 7, 2007

(65) Prior Publication Data
US 2009/0116177 A1 May 7, 2009

(51) Int. Cl.
*H02B 5/00* (2006.01)
(52) U.S. Cl. .................. 361/611; 361/624; 361/639; 174/71 B; 174/72 B
(58) Field of Classification Search ................ None
See application file for complete search history.

(56) References Cited
U.S. PATENT DOCUMENTS

| | | | |
|---|---|---|---|
| 4,121,276 A | 10/1978 | Kovatch et al. ............ 361/614 |
| 6,018,455 A | 1/2000 | Wilkie et al. ............... 361/676 |
| 6,040,976 A | 3/2000 | Bruner et al. | |
| 6,111,745 A | 8/2000 | Wilkie et al. ............... 361/605 |
| 6,381,122 B2 | 4/2002 | Wagener ..................... 361/611 |
| 6,674,006 B1 | 1/2004 | Linehan et al. ........... 174/72 B |
| 6,934,147 B2 | 8/2005 | Miller et al. ............... 361/611 |
| 7,173,810 B2 | 2/2007 | Rowe et al. | |

*Primary Examiner*—Boris L Chervinsky
(74) *Attorney, Agent, or Firm*—Martin J. Moran

(57) ABSTRACT

An electrical bus assembly for an electrical enclosure includes a single branch circuit with a plurality of branch circuit buses. First electrical bus members include first ends electrically connected to corresponding branch circuit buses, and second ends electrically connected to a first circuit breaker. Second electrical bus members include first ends electrically connected to corresponding branch circuit buses, and second ends electrically connected to a second circuit breaker. The single branch circuit provides electrical power to the first and second circuit breakers. The first electrical bus members extend in a first lateral direction with respect to the branch circuit buses, and the second electrical bus members extend in a second, opposite lateral direction. The electrical bus assembly enables the first circuit breaker to be disposed horizontally adjacent to the second circuit breaker within a corresponding one of the cells of the electrical enclosure.

19 Claims, 5 Drawing Sheets

ELECTRICAL ENCLOSURE AND ELECTRICAL BUS ASSEMBLY THEREFOR

BACKGROUND OF THE INVENTION

1. Field of the Invention

The invention relates generally to electrical enclosures and, more particularly, to electrical bus assemblies for electrical enclosures.

2. Background Information

Electrical switching apparatus include, for example, circuit switching devices and circuit interrupters such as circuit breakers, contactors, motor starters, motor controllers and other load controllers.

Low voltage (e.g., without limitation, up to about 690 VAC; any suitable low voltage) circuit breakers, for example, which are used in power distribution systems, are commonly mounted, either alone or in combination with additional switchgear, within an electrical enclosure (e.g., without limitation, a load center; a switchgear cabinet). The circuit breakers are typically disposed within sections of the electrical enclosure, referred to as cells. The circuit breaker cells can be disposed beside, above, or below one another within the electrical enclosure.

Traditionally, electrical enclosures are limited to a single circuit breaker on a given branch circuit. This can make the intended goals of minimizing the overall size of the electrical enclosure and minimizing the amount and complexity of the electrical bus work of the electrical enclosure difficult. For example, FIG. 1 schematically shows an electrical enclosure 1 including a first circuit breaker 3 disposed horizontally beside a second circuit breaker 5. Specifically, the first circuit breaker 3 is disposed in a first cell 7 of the electrical enclosure 1 and the second circuit breaker 5 is disposed in an adjacent second cell 9. Thus, a barrier 11 is disposed between the first and second cells 7, 9, as shown. A first branch circuit 13, which branches off of a primary electrical bus 15 (e.g., trunk) supplies power to the first circuit breaker 3. Among the disadvantages of this configuration is that a separate, second branch circuit 17 is required to supply power to the second circuit breaker 5 within cell 9 of the electrical enclosure 1. Additionally, the barrier 11 (e.g., enclosure wall), which is disposed between first circuit breaker 3 and second circuit breaker 5, occupies valuable space within the electrical enclosure 1 and prevents the circuit breakers 3, 5 from being positioned as closely together as desired.

It will, therefore, be appreciated that prior proposals for positioning circuit breakers have required one of the following two compromises: (1) when the circuit breakers are disposed side-by-side in the same horizontal plane, two separate cells (e.g., first and second cells 7, 9) are required, each of which has a substantial width and requires its own branch circuit, thereby requiring the electrical enclosure to have an overall width that is much larger than desired; and (2) positioning the circuit breakers in different planes (e.g., without limitation, stacking the circuit breakers vertically). These limitations can, in large part, be attributed to the relatively large size of known electrical bus members and mandated clearance (i.e., minimum distance) requirements (phase-to-phase; phase-to-ground) of the circuit breaker.

There is, therefore, room for improvement in electrical enclosures and in electrical bus assemblies therefor.

SUMMARY OF THE INVENTION

These needs and others are met by embodiments of the invention, which are directed to a bus assembly for configuring two electrical switching apparatus, such as circuit breakers, horizontally adjacent to one another within a corresponding cell of an electrical enclosure (e.g., without limitation, load center; switchgear cabinet), without requiring a separate branch circuit for each circuit breaker, thereby optimizing the circuit breaker density (i.e., number of circuit breakers within a given space) with respect to the electrical enclosure.

As one aspect of the invention, an electrical bus assembly is provided for an electrical enclosure. The electrical enclosure includes a first end, a second end disposed opposite and distal from the first end, a first side, a second side disposed opposite and distal from the first side, a number of cells, a plurality of electrical switching apparatus, and a primary circuit including a plurality of primary electrical buses structured to be electrically connected to the electrical switching apparatus. The electrical bus assembly comprises: a single branch circuit comprising a plurality of branch circuit buses, each of the branch circuit buses being structured to extend from a corresponding one of the primary electrical buses at or about the first end of the electrical enclosure toward the second end of the electrical enclosure; a plurality of first electrical bus members, each including a first end electrically connected to a corresponding one of the branch circuit buses, and a second end structured to be electrically connected to a first one of the electrical switching apparatus; a plurality of second electrical bus members, each of the second electrical bus members including a first end electrically connected to a corresponding one of the branch circuit buses, and a second end structured to be electrically connected to a second one of the electrical switching apparatus. The single branch circuit is structured to provide electrical power to the first one of the electrical switching apparatus and the second one of the switching apparatus. The first electrical bus members extend in a first lateral direction with respect to the branch circuit buses and the second electrical bus members extend in a second lateral direction, with respect to the branch circuit buses, wherein the first lateral direction of the first electrical bus members is generally opposite from the second lateral direction of the second electrical bus members. The electrical bus assembly is structured to enable the first one of the electrical switching apparatus to be disposed horizontally adjacent to the second one of the electrical switching apparatus within a corresponding one of the number of cells of the electrical enclosure.

The plurality of branch circuit buses of the single branch circuit may be a first branch bus, a second branch bus, and a third branch bus. The plurality of first electrical bus members may be a first pair of electrical bus members, a second pair of electrical bus members, and a third pair of electrical bus members, and the plurality of second electrical bus members may be a fourth pair of electrical bus members, a fifth pair of electrical bus members, and a sixth pair of electrical bus members. The first pair of electrical bus members may extend from the first branch bus toward the second side of the electrical enclosure. The second pair of electrical bus members may extend from the second branch bus toward the second side of the electrical enclosure, and may be disposed between the first pair of electrical bus members and the third pair of electrical bus members. The third pair of electrical bus members may extend from the third branch bus toward the second side of the electrical enclosure, and may be disposed between the second side of the electrical enclosure and the second pair of electrical bus members. The fourth pair of electrical bus members may extend from the first branch bus toward the first side of the electrical enclosure. The fifth pair of electrical bus members may extend from the second branch bus toward the first side of the electrical enclosure, and may be disposed between the fourth pair of electrical bus members and the sixth pair of electrical bus members. The sixth pair of electrical bus members may extend from the third branch bus toward the first side of the electrical enclosure, and may be disposed between the first side of the electrical enclosure and the fifth pair of electrical bus members. The electrical bus assembly may have a width defined by the distance between the third pair of electrical bus members and the fourth pair of electrical bus members. The width may be less than 22 inches.

Each electrical bus member of the plurality of first electrical bus members and the plurality of second electrical bus members may have a first end, a second end, and an intermediate portion therebetween. The intermediate portion may include a first bend in a first direction and a second bend in a second direction, wherein the first direction of the first bend is opposite the second direction of the second bend in order that the intermediate portion is substantially perpendicular with respect to the first end of the each electrical bus member and the second end of the each electrical bus member. At least the intermediate portion of the each electrical bus member may be covered by an electrical insulator.

As another aspect of the invention, an electrical enclosure comprises: a first end; a second end disposed opposite and distal from the first end; a first side; a second side disposed opposite and distal from the first side; a number of cells; a plurality of electrical switching apparatus disposed in the number of cells; a primary circuit including a plurality of primary electrical buses electrically connected to the electrical switching apparatus; and an electrical bus assembly comprising: a single branch circuit comprising a plurality of branch circuit buses, each of the branch circuit buses extending from a corresponding one of the primary electrical buses of the primary circuit at or about the first end of the electrical enclosure toward the second end of the electrical enclosure, a plurality of first electrical bus members, each of the first electrical bus members including a first end electrically connected to a corresponding one of the branch circuit buses and a second end electrically connected to a first one of the electrical switching apparatus, a plurality of second electrical bus members, each of the second electrical bus members including a first end electrically connected to a corresponding one of the branch circuit buses and a second end electrically connected to a second one of the electrical switching apparatus. The single branch circuit provides electrical power to the first one of the electrical switching apparatus and the second one of the switching apparatus. The first electrical bus members extend in a first lateral direction with respect to the branch circuit buses and the second electrical bus members extend in a second lateral direction with respect to the branch circuit buses, wherein the first lateral direction of the first electrical bus members is generally opposite from the second lateral direction of the second electrical bus members. The first one of the electrical switching apparatus is disposed horizontally adjacent to the second one of the electrical switching apparatus within a corresponding one of the number of cells of the electrical enclosure.

The at least one electrical switching apparatus may be a first circuit breaker and a second circuit breaker, wherein the first circuit breaker and the second circuit breaker are disposed side-by-side in the corresponding one of the number of cells of the electrical enclosure. The plurality of electrical bus members may be a first plurality of runbacks electrically connectable to the first circuit breaker and a second plurality of runbacks electrically connectable to the second circuit breaker. The electrical enclosure may include a first horizontal plane and a second horizontal plane, and the first circuit breaker and the second circuit breaker may each include a plurality of first terminals and a plurality of second terminals, wherein the first terminals of the first circuit breaker and the first terminals of the second circuit breaker are disposed in the first horizontal plane, wherein the second terminals of the first circuit breaker and the second terminals of the second circuit breaker are disposed in the second horizontal plane, wherein the first pair of electrical bus members, the second pair of electrical bus members, and the third pair of electrical bus members are disposed in the first horizontal plane, and wherein the fourth pair of electrical bus members, the fifth pair of electrical bus members, and the sixth pair of electrical bus members are disposed in the second horizontal plane.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
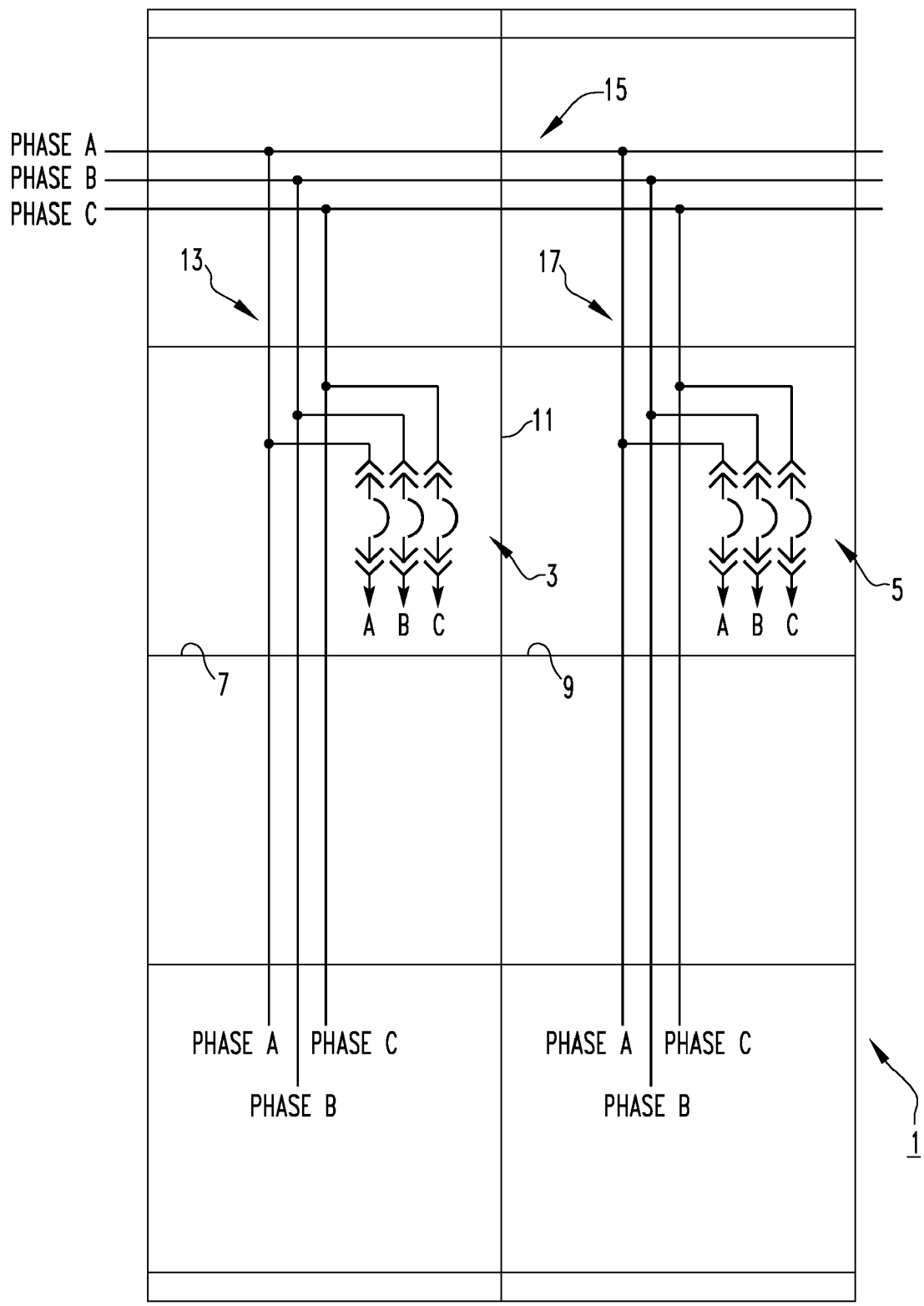
FIG. 1 is a schematic view of a conventional electrical enclosure and bus assembly therefor.

For purposes of illustration, embodiments of the invention will be described as applied to a low voltage circuit breaker, although it will become apparent that they could also be applied to support and insulate the electrical bus members of any other known or suitable electrical switching apparatus (e.g., without limitation, circuit breakers other than low voltage circuit breakers; contactors; motor starters; motor controllers; and other load controllers) housed within an electrical enclosure (e.g., without limitation, a load center; a switchgear cabinet).

Directional phrases used herein, such as, for example, left, right, front, back, top, bottom and derivatives thereof, relate to the orientation of the elements shown in the drawings and are not limiting upon the claims unless expressly recited therein.

As employed herein, the term "electrical bus" or "electrical bus member" means a rigid conductor which carries or transfers voltage, current and/or power.

As employed herein, the term "stab" refers to an electrical bus member which extends generally horizontally with respect to an electrical enclosure and is electrically connectable to an electrical switching apparatus.

As employed herein, the term "primary circuit" refers to the plurality of primary (e.g., main) electrical buses of the electrical enclosure, which receive electrical power from, for example and without limitation, the utility. The primary circuit is analogous to the trunk of a tree, wherein a number of "branch circuits" (i.e., analogous to the branches of the tree) branch off of the trunk and are electrically connected to a plurality of corresponding electrical switching apparatus within the electrical enclosure, in order to supply electrical power thereto. The branch circuit includes a plurality of energizable branch circuit buses, which are phase buses as contrasted, for example, with a ground bus or a neutral bus.

As employed herein, the term "fastener" refers to any suitable connecting or tightening mechanism expressly including, but not limited to, screws, bolts and the combinations of bolts and nuts (e.g., without limitation, lock nuts) and bolts, washers and nuts.

As employed herein, the statement that two or more parts are "coupled" together shall mean that the parts are joined together either directly or joined through one or more intermediate parts.

As employed herein, the term "number" refers to the quantity one or an integer greater than one (i.e., a plurality).

Figure 2:
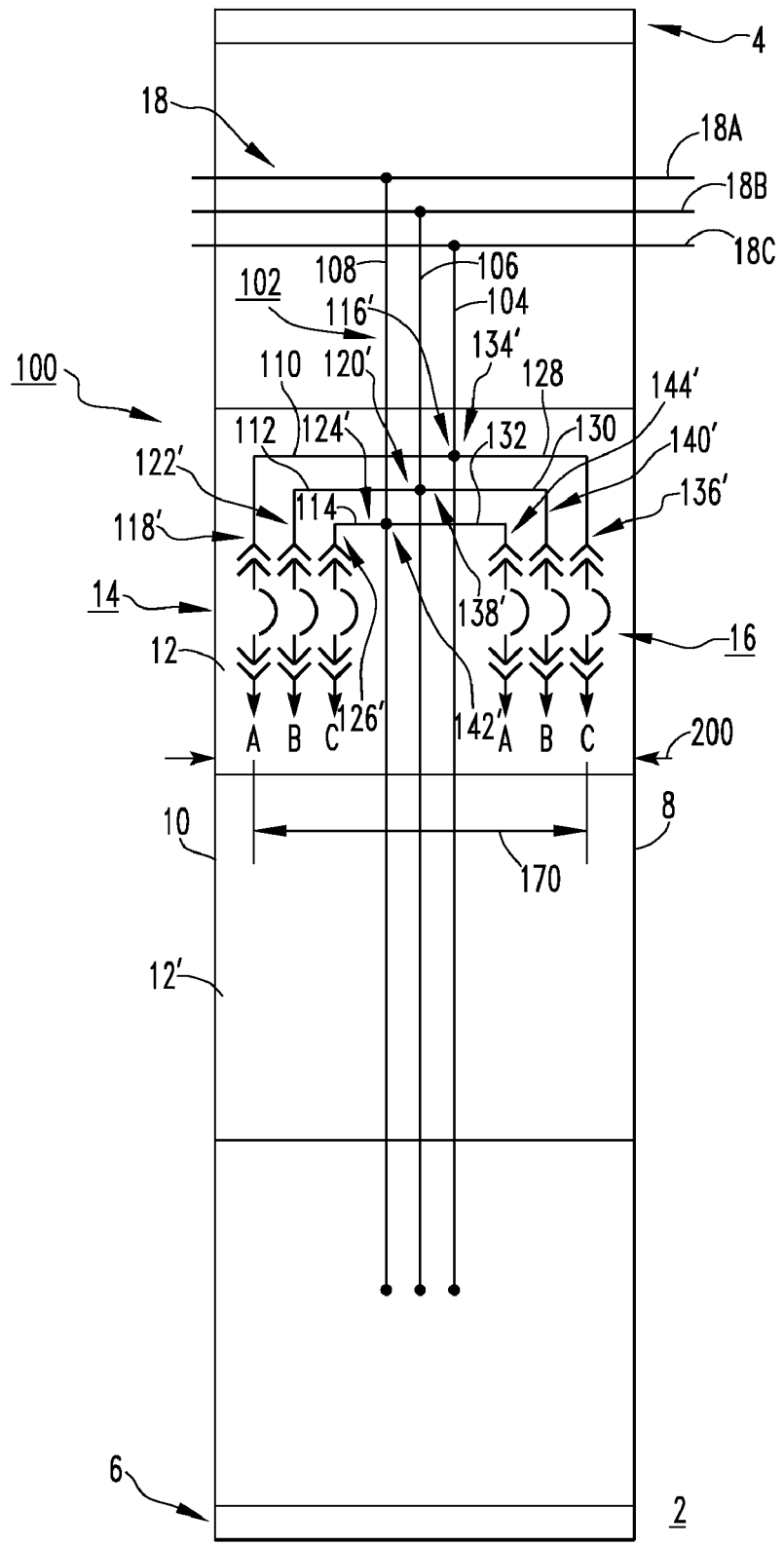
FIG. 2 is a schematic view of an electrical enclosure and bus assembly therefor, in accordance with an embodiment of the invention.

FIG. 2 schematically illustrates an electrical assembly 100 for an electrical enclosure, such as a switchgear cabinet 2. The electrical enclosure 2 includes a first end 4, a second end 6 disposed opposite and distal from the first end 4, first and second opposing sides 8,10, and a number of cells 12,12'. Two cells 12,12' are shown in the example of FIG. 2, although it will be appreciated that cell 12' is not required. It will also be appreciated that the electrical enclosure 2 could have more than two cells 12,12'. A plurality of electrical switching apparatus such as, for example, first and second circuit breakers 14,16 (schematically shown in FIG. 2; shown in simplified form in phantom line drawing in FIG. 3; partially shown in simplified form in phantom line drawing in FIG. 5), are disposed in the cell 12. A primary circuit 18 includes a plurality of primary electrical buses 18A,18B,18C, which electrically connect to the circuit breakers 14,16.

Figure 3:
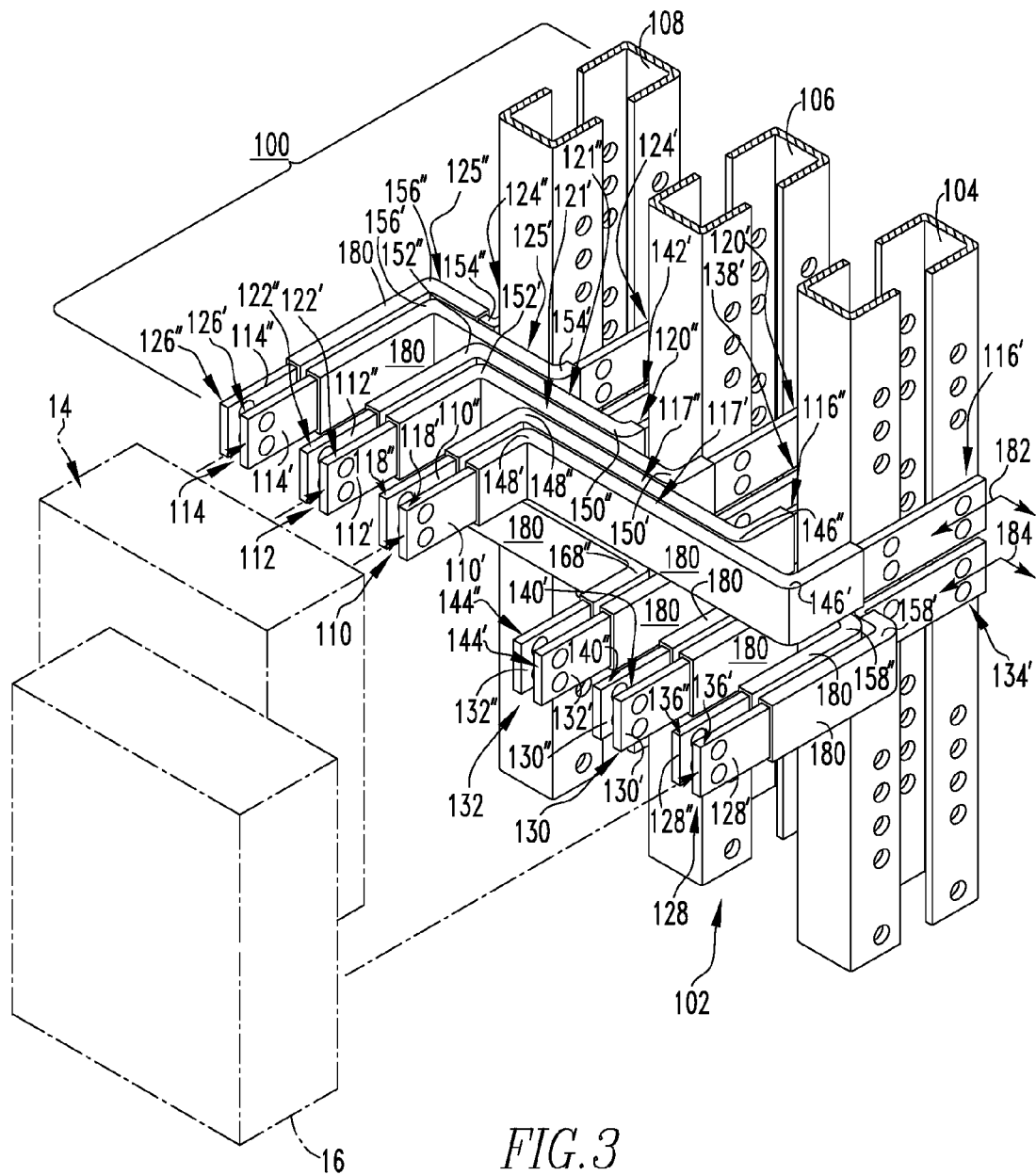
FIG. 3 is an isometric view of a bus assembly in accordance with an embodiment of the invention, also showing two circuit breakers in simplified form in phantom line drawing.
Figure 4:
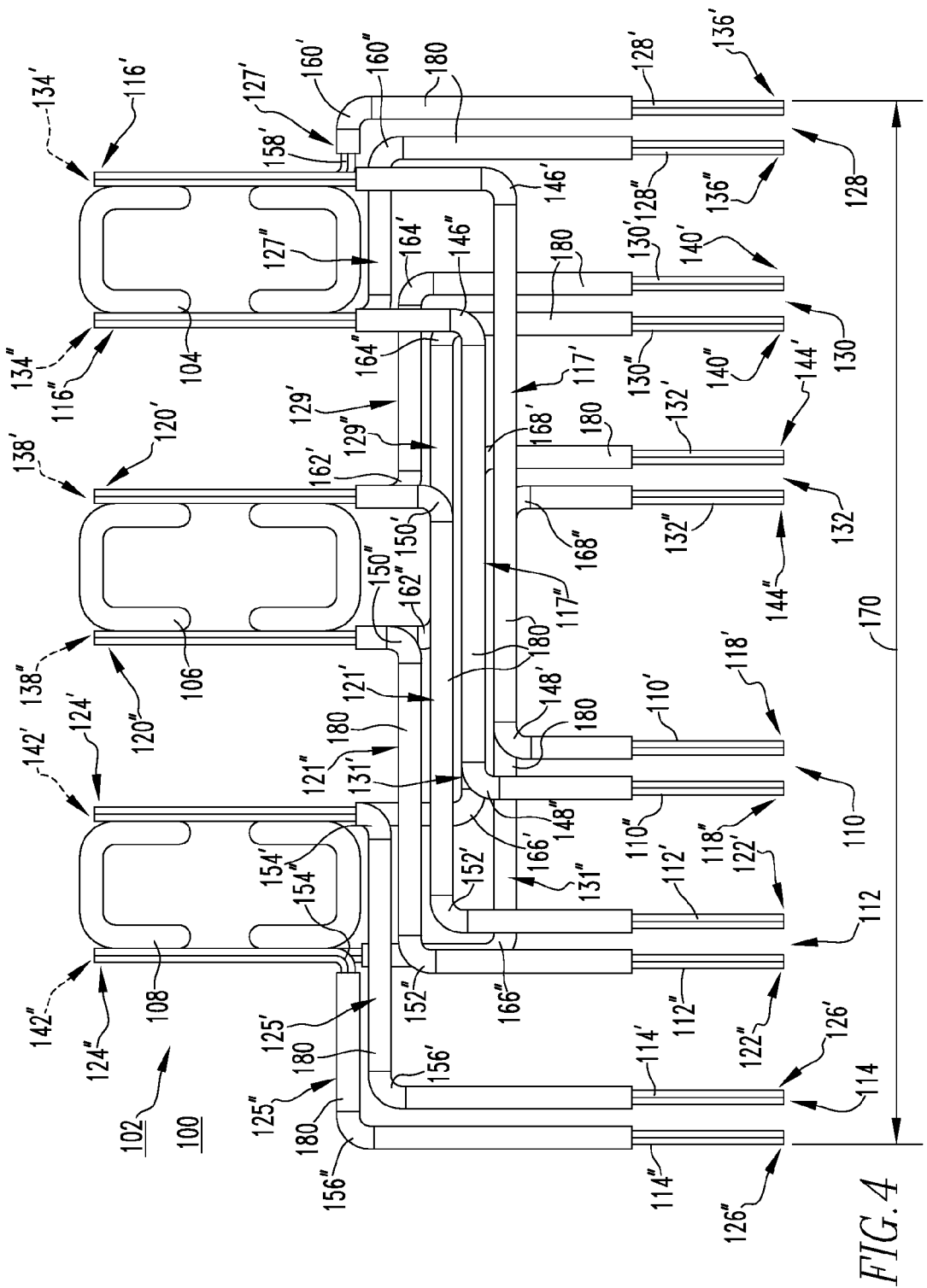
FIG. 4 is a top plan view of the bus assembly of FIG. 3.

Continuing to refer to FIG. 2, and also to FIGS. 3 and 4, the electrical bus assembly 100 includes a single branch circuit 102 having a plurality of branch circuit buses 104,106,108 (three are shown). Each of the branch circuit buses 108,106, 104 is structured to extend from a corresponding one of the primary electrical buses 18A,18B,18C, respectively, at or about the first end 4 of the electrical enclosure 2, toward the second end 6 of the electrical enclosure 2, as shown in FIG. 2. In the example shown and described herein, the single branch circuit 102 includes a plurality of first electrical bus members 110',110",112',112",114',114" (all shown in FIGS. 3 and 4) each having a first end 116',116",120',120",124',124" (all shown in FIG. 4) electrically connected to a corresponding one of the branch circuit buses 104,106,108, and a second end 118',118",122',122",126',126" (all shown in FIGS. 3 and 4) structured to be electrically connected to the first circuit breaker 14 (shown in simplified form in phantom line drawing in FIG. 3; partially shown in simplified form in phantom line drawing in FIG. 5). Similarly, the second circuit breaker 16 is electrically connected to the second ends 136', 136", 140', 140", 144', 144" of a plurality of second electrical bus members 128',128",130',130",132',132", the first ends 134', 134", 138',138" and 142',142" of which are respectively electrically connected to a corresponding one of the branch circuit buses 104, 106 and 108, as shown in FIG. 4. Thus, the single branch circuit 102 provides electrical power to both the first circuit breaker 14 and the second circuit breaker 16.

As best shown in FIGS. 3 and 4, the first electrical bus members 110',110",112',112",114',114" extend in a first lateral direction with respect to the branch circuit buses 104, 106,108 and the second electrical bus members 128',128", 130',130",132',132" extend in a second, opposite lateral direction. For example and without limitation, the first electrical bus members 110',110",112',112",114',114" extend to the left (from the perspective of FIGS. 3 and 4) and the second electrical bus members 128',128",130',130",132',132" extend to the right (from the perspective of FIGS. 3 and 4). In this manner, the electrical bus assembly 100 enables the first and second circuit breakers 14,16 to be disposed horizontally adjacent to one another within a corresponding one of the cells 12 of the electrical enclosure 2. Thus, the disclosed electrical bus assembly 100 enables the circuit breakers 14,16 to be disposed side-by-side in close proximity with respect to one another within the cell 12 because the first and second electrical bus members 110',110",112',112",114',114" and 128',128",130',130",132',132" (e.g., stabs, as defined herein), are disposed in a unique configuration that substantially increases the circuit breaker density (i.e., number of circuit breakers within a given space) of the electrical enclosure 2 over known electrical enclosure designs (e.g., without limitation, electrical enclosure 1 of FIG. 1). For example, in one non-limiting example of the invention, the cell 12 (FIG. 2) of the electrical enclosure 2 (FIG. 2) has a width 200 of about 22 inches, and the electrical bus assembly 100 has a width 170 (FIGS. 2 and 4) of less than 22 inches. Hence, circuit breaker density is doubled with respect to the prior art enclosure 1 of FIG. 1, wherein one single circuit breaker 3,5 is disposed within cells 7,9, respectively. In other words, two relatively smaller circuit breakers 14,16 can be installed (e.g., retro-fit) into the same amount of space (e.g., cell 12) within the electrical enclosure 2 that was previously occupied by a relatively larger single circuit breaker (e.g., circuit breakers 3 or 5 of FIG. 1).

Among other benefits of the example electrical bus assembly 100, is that it is of a modular design, such that an existing branch circuit bus (e.g., without limitation, 104,106,108) can be employed, as is, without modification. For example and without limitation, hole patterns (not numbered, but shown in FIG. 3), which were previously utilized for a single circuit breaker connection, can also be utilized for two circuit breaker connections using the electrical bus assembly 100, as shown in FIG. 3. It will further be appreciated that this "dual-cell" (e.g., two circuit breakers 14,16 within a single cell 12) capability can be employed either above or below a traditional, full-size circuit breaker (e.g., circuit breakers 3 and 5 of FIG. 1) within the same electrical enclosure 2. Accordingly, the disclosed electrical bus assembly 100 can be employed in a variety of applications including, for example and without limitation, to replace an existing circuit breaker compartment (e.g., cells 7 or 9 of FIG. 1).

As will now be described, the disclosed electrical bus assembly 100 employs a unique interwoven electrical bus member design, a relatively smaller bus size, and electrical insulation to overcome the disadvantages of known electrical enclosures (e.g., electrical enclosure 1 of FIG. 1), thereby allowing two independent circuit breakers 14,16 to operate from a single branch circuit 102 in a side-by-side configuration within the same cell 12 (FIG. 2). Specifically, the single branch circuit 102 of the example electrical bus assembly 100 includes a first branch bus 104, a second branch bus 106, and a third branch bus 108. Although not required, the plurality of first electrical bus members 110',110",112',112",114',114" shown and described herein includes first, second and third pairs of electrical bus members 110,112,114, and the plurality of second electrical bus members 128',128",130',130",132', 132" shown and described herein includes fourth, fifth and sixth pairs of electrical bus members 128,130,132, as shown in FIGS. 3 and 4. The first pair of electrical bus members 110 is electrically connected to the first branch bus 104, the second pair of electrical bus members 112 is electrically connected to the second branch bus 106, the third pair of electrical bus members 114 is electrically connected to the third branch bus 108, the fourth pair of electrical bus members 128 is electrically connected to the first branch bus 104 proximate to and below (from the perspective of FIG. 3) the first pair of electrical bus members 112, the fifth pair of electrical bus members 130 is electrically connected to the second branch bus 106 proximate to and below (from the perspective of FIG. 3) the second pair of electrical bus members 112, and the sixth pair of electrical bus members 132 is electrically connected to the third branch bus 108 proximate to and below (from the perspective of FIG. 3) the third pair of electrical bus members 114.

Referring again to FIG. 2, it will be appreciated that the first pair of electrical bus members 110 extends from the first branch bus 104 toward the second side 10 of the electrical enclosure 2. The second pair of electrical bus members 112 extends from the second branch bus 106 toward the second side 10 of the electrical enclosure 2 and is disposed between the first and third pairs of electrical bus members 110,114. The third pair of electrical bus members 114 extends from the third branch bus 108 toward the second side 10 of the electrical enclosure 2, and is disposed between the second side 10 of the electrical enclosure 2 and the second pair of electrical bus members 112. The fourth pair of electrical bus members 128 extends from the first branch bus 104 toward the first side 8 of the electrical enclosure 2. The fifth pair of electrical bus members 130 extends from the second branch bus 106 toward the first side 8 of the electrical enclosure 2, and is disposed between the fourth and sixth pairs of electrical members 128,132, and the sixth pair of electrical bus members 132 extends from the third branch bus 108 toward the first side 8 of the electrical enclosure 2 and is disposed between the first side 8 of the electrical enclosure 2 and the fifth pair of electrical bus members 130.

Figure 5:
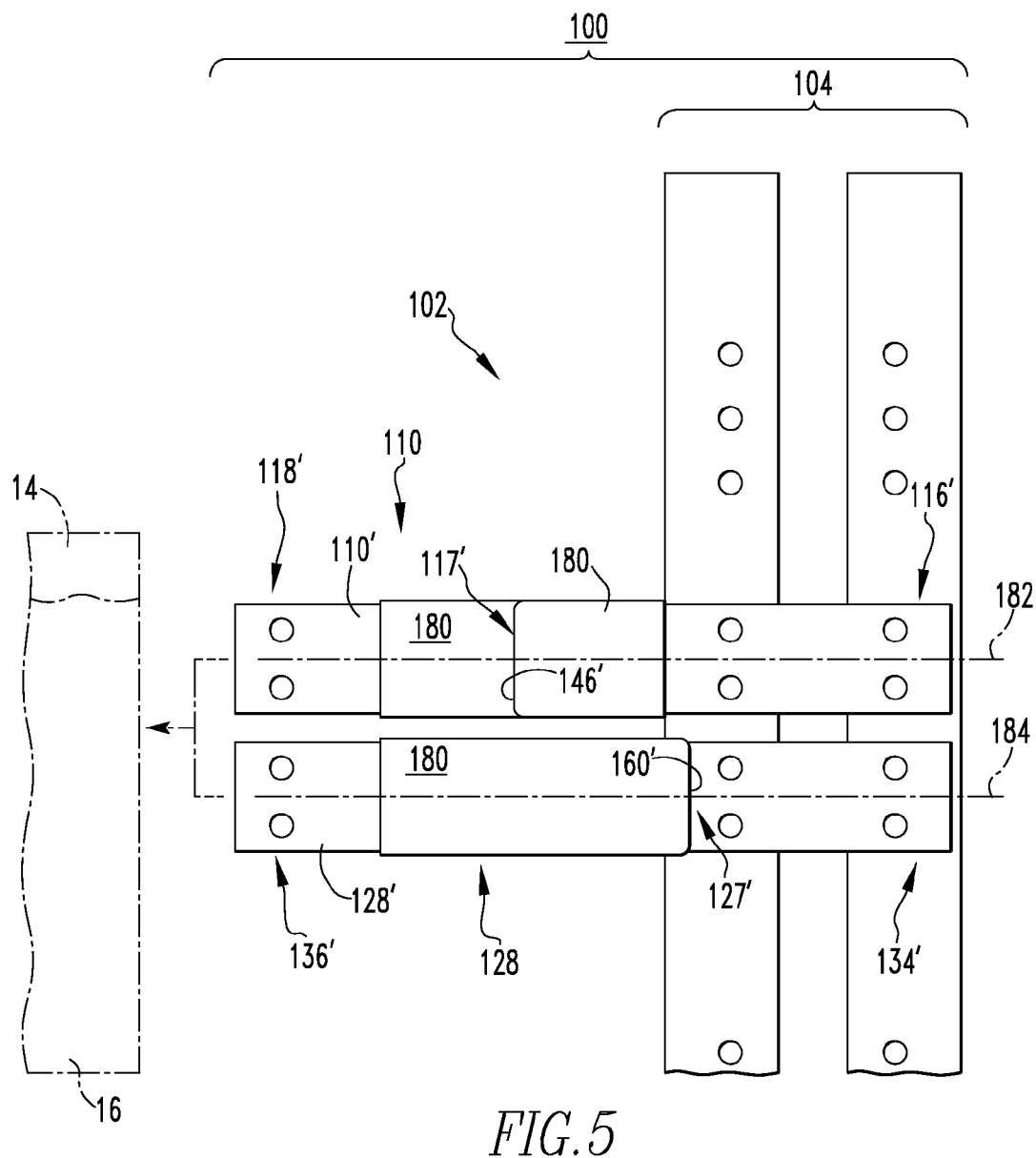
FIG. 5 is a side elevation view of the electrical bus assembly of FIG. 4.

As shown in FIG. 3, the electrical enclosure 2 (FIG. 2) includes a first horizontal plane 182 (also shown in FIG. 5) and a second horizontal plane 184 (also shown in FIG. 5). The first, second and third pairs of electrical bus members 110, 112,114 are disposed in the first horizontal plane 182, and the fourth, fifth and sixth pairs of electrical bus members 128, 130,132 are disposed in the second horizontal plane 184. It will be appreciated that for convenience of installing the circuit breakers 14,16 in the desired orientation within the electrical enclosure 2 (FIG. 2) with respect to the electrical bus assembly 100, each of the example circuit breakers 14,16 may respectively include an adapter (not shown) to, for example, extend the first, second and third pairs of electrical bus members 110,112,114 downward (from the perspective of FIG. 5) to be electrically connected to the first circuit breaker 14 at the desired location, and to extend the fourth, fifth and sixth pairs of electrical bus members 128,130,132 upward (from the perspective of FIG. 5) to be electrically connected at the desired location on the second circuit breaker 116. This aspect of the invention will be further appreciated with respect to FIG. 5, which schematically shows the second end 118' of electrical bus member 110' electrically connected to the first circuit breaker 14 (partially shown), and the second end 136' of electrical bus member 128' electrically connected to a substantially similar location on the second circuit breaker 16. It will, however, be appreciated that any known or suitable alternative electrical switching apparatus other than the circuit breakers 14,16 shown and described herein could be employed in any suitable configuration, without departing from the scope of the invention.

Also shown in FIG. 5 is the fact that the first pair of electrical bus members 110 is vertically spaced from, and parallel with respect to, the fourth pair of electrical bus members 128. As shown in FIG. 3, the first pair of electrical bus members 110 is also vertically spaced from, and parallel with respect to, the fifth and sixth pair of electrical bus members 130,132. Similarly, the second pair of electrical bus members 112 is vertically spaced from, and parallel with respect to, the fifth and sixth pair of electrical bus members 130,132, and the third pair of electrical bus members 114 is vertically spaced from, and parallel with respect to, the sixth pair of electrical bus members 132. In other words, each of the first electrical bus members 110',110''',112',112''',114',114''' extends substantially horizontally with respect to the first, second and third branch buses 104,106,108 over top of (from the perspective of FIGS. 3 and 4) at least a portion of at least one of second electrical bus members 128',128''',130',130''',132',132'''.

Each electrical bus member 110',110''' of the first pair of electrical bus members 110 includes an intermediate portion 117',117''' formed between first bends 146',146''' and second bends 148',148''', respectively, which extend in a second, opposing direction. The intermediate portions 117',117''' of the first electrical bus members 110', 110''' extend substantially horizontally with respect to the branch circuit buses 104,106,108 to overlay at least a portion of the second pair of electrical bus members 112. Each electrical bus member 112', 112''' of the second pair of electrical bus members 112 likewise includes an intermediate portion 121',121''' between first bends 150',150''' and second bends 152',152''', respectively. The intermediate portions 121',121''' of the second electrical bus members 112',112''' extend substantially horizontally with respect to the branch circuit buses 104,106,108 and overlay at least a portion of the third pair of electrical bus members 114. Similarly, intermediate portion 129',129''' (FIG. 4) of at least one electrical bus member 130',130''' of the fifth pair of electrical bus members 130 extend substantially horizontally with respect to the branch circuit buses 104,106, 108 and overlay at least a portion of the fourth pair of electrical bus members 128 (see, for example, second bend 164' of electrical bus member 130' overlaying (e.g., in front of) first bend 158''' of bus member 128''' in FIG. 4). Finally, the intermediate portions 131',131''' (FIG. 4) of the electrical bus members 132',132''' of the sixth pair of electrical bus members 132, which are disposed between first bends 166',166''' and second bends 168',168''', respectively, extend substantially horizontally with respect to the branch buses 104,106,108 and overlay at least a portion of the fifth pair of electrical bus members 130. In other words, as shown in FIG. 4, the term "overlay" as employed herein, refers to the close proximal relationship with which the first electrical bus members 110', 110''',112',112''',114',114''' are disposed, one in front of the other in the same horizontal plane 182 (FIG. 3). The second electrical bus members 128', 128''', 130', 130''', 132', 132''' are similarly disposed in the overlaying relationship shown in FIG. 4, but in the second horizontal plane 184 (FIG. 3) and extending in the opposite lateral direction with respect to the branch circuit buses 104,106,108. It will, therefore, be appreciated that each electrical bus member 110',110''',112',112''', 114',114''' and 128',128''',130',130''',132',132''' of the example electrical bus assembly 100 respectively includes a first end 116',116''',120',120''',124',124''',134',134''',138',138''',142',142''', a second end 118',118''',122',122''',126',126''',136',136''',140', 140''',144',144''', a first bend 146',146''',150',150''',154',154''', 158',158''',162',162''',166',166''', a second bend 148',148''',152',152''',156',156''',160',160''',164',164''',168',168''', and an intermediate portion 117',117''',121',121''',125',125''', 127',127''',129',129''',131',131''' therebetween, in order to enable the pairs of electrical bus members 110,112,114,128, 130,132 to be disposed in close proximity with respect to one another, as shown in FIGS. 2-5.

At least the intermediate portions 117',117''',121',121''',125',125''',127',127''',129',129''',131',131''' of the electrical bus members 110',110''',112',112''',114',114''', 128',128''',130',130''',132',132''' are covered by an electrical insulator 180. It will be appreciated that such electrical insulator 180 can be made from any known or suitable electrically insulating material such as, for example and without limitation, a suitable electrical insulation media, such as an epoxy or rubber coating. In this manner, undesired electrical arcing between electrically conductive components (e.g., without limitation, electrical bus members) having different potentials, is avoided, while enabling the electrical bus members 110',110",112',112",114',114", 128',128",130',130",132',132" of differing potentials to be disposed in close proximity to one another. It will be appreciated that any known or suitable alternative electrical insulator could be employed, without departing from the scope of the invention. It will also be appreciated that although the aforementioned width 170 of the example electrical bus assembly 100 is less than 22 inches, as measured between the third pair of electrical bus members 114 and the fourth pair of electrical bus members 128, the electrical bus assembly 100 could be made to have other suitable dimensions, in accordance with the invention.

Accordingly, the disclosed electrical bus assembly 100 provides a modular mechanism for arranging two electrical switching apparatus (e.g., without limitation, first and second circuit breakers 14,16) side-by-side in the same cell 12 of an electrical enclosure 2, as shown in FIG. 2, by enabling both of the circuit breakers 14,16 to be electrically connected to the same, single branch circuit 102. The electrical bus assembly 100 is also modular in design so as to be employable in a variety of different configurations both in new electrical enclosures 2, as well as a retro-fit for existing electrical enclosures (e.g., electrical enclosure 1 of FIG. 1).

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. An electrical bus assembly for an electrical enclosure, said electrical enclosure including a first end, a second end disposed opposite and distal from the first end, a first side, a second side disposed opposite and distal from the first side, a number of cells, a plurality of electrical switching apparatus, and a primary circuit including a plurality of primary electrical buses structured to be electrically connected to said electrical switching apparatus, said electrical bus assembly comprising:

a single branch circuit comprising a plurality of branch circuit buses, each of said branch circuit buses being structured to extend from a corresponding one of said primary electrical buses at or about the first end of said electrical enclosure toward the second end of said electrical enclosure;

a plurality of first electrical bus members, each of said first electrical bus members including a first end and a second end, the first end of said each of said first electrical bus members being electrically connected to a corresponding one of said branch circuit buses, the second end of said each of said first electrical bus members being structured to be electrically connected to a first one of said electrical switching apparatus;

a plurality of second electrical bus members, each of said second electrical bus members including a first end and a second end, the first end of said each of said second electrical bus members being electrically connected to a corresponding one of said branch circuit buses, the second end of said each of said second electrical bus members being structured to be electrically connected to a second one of said electrical switching apparatus, wherein said single branch circuit is structured to provide electrical power to said first one of said electrical switching apparatus and said second one of said switching apparatus, wherein said first electrical bus members extend in a first lateral direction with respect to said branch circuit buses and said second electrical bus members extend in a second lateral direction, with respect to said branch circuit buses, wherein said first lateral direction of said first electrical bus members is generally opposite from said second lateral direction of said second electrical bus members, and wherein said electrical bus assembly is structured to enable said first one of said electrical switching apparatus to be disposed horizontally adjacent to said second one of said electrical switching apparatus within a corresponding one of said number of cells of said electrical enclosure.

2. The electrical bus assembly of claim 1 wherein said plurality of branch circuit buses of said single branch circuit is a first branch bus, a second branch bus, and a third branch bus; wherein said plurality of first electrical bus members is a first pair of electrical bus members, a second pair of electrical bus members, and a third pair of electrical bus members; and wherein said plurality of second electrical bus members is a fourth pair of electrical bus members, a fifth pair of electrical bus members, and a sixth pair of electrical bus members.

3. The electrical bus assembly of claim 2 wherein said first pair of electrical bus members is structured to be disposed closer to the first end of said electrical enclosure than said fourth pair of electrical bus members; wherein said second pair of electrical bus members is structured to be disposed closer to the first end of said electrical enclosure than the fifth pair of electrical bus members; and wherein said third pair of electrical bus members is structured to be disposed closer to the first end of said electrical enclosure than said sixth pair of electrical bus members.

4. The electrical bus assembly of claim 3 wherein said first pair of electrical bus members is vertically spaced from, and parallel with respect to, said fourth pair of electrical bus members, said fifth pair of electrical bus members, and said sixth pair of electrical bus members; wherein said second pair of electrical bus members is vertically spaced from, and parallel with respect to, said fifth pair of electrical bus members and said sixth pair of electrical bus members; and wherein said third pair of electrical bus members is vertically spaced from, and parallel with respect to, said sixth pair of electrical bus members.

5. The electrical bus assembly of claim 2 wherein said electrical bus assembly has a width; wherein said width is defined by the distance between said third pair of electrical bus members and said fourth pair of electrical bus members; and wherein said width is less than 22 inches.

6. The electrical bus assembly of claim 2 wherein each electrical bus member of said plurality of first electrical bus members and said plurality of second electrical bus members has a first end, a second end, and an intermediate portion therebetween; wherein said intermediate portion includes a first bend in a first direction and a second bend in a second direction; and wherein said first direction of said first bend is opposite said second direction of said second bend in order that said intermediate portion is substantially perpendicular with respect to the first end of said each electrical bus member and the second end of said each electrical bus member.

7. The electrical bus assembly of claim 6 wherein at least said intermediate portion of said each electrical bus member is covered by an electrical insulator.

8. The electrical bus assembly of claim 6 wherein said intermediate portion of each electrical bus member of said first pair of electrical bus members extends substantially horizontally with respect to said plurality of branch circuit buses and overlays at least a portion of said second pair of electrical bus members; wherein said intermediate portion of each electrical bus member of said second pair of electrical bus members extends substantially horizontally with respect to said plurality of branch circuit buses and overlays at least a portion of said third pair of electrical bus members; wherein said intermediate portion of at least one electrical bus member of said fifth pair of electrical bus members extends substantially horizontally with respect to said plurality of branch circuit buses and overlays at least a portion of said fourth pair of electrical bus members; and wherein said intermediate portion of each electrical bus member of said sixth pair of electrical bus members extends substantially horizontally with respect to said plurality of branch circuit buses and overlays at least a portion of said fifth pair of electrical bus members.

9. The electrical bus assembly of claim 2 wherein said first pair of electrical bus members is electrically connected to said first branch bus; wherein said second pair of electrical bus members is electrically connected to said second branch bus; wherein said third pair of electrical bus members is electrically connected to said third branch bus; wherein said fourth pair of electrical bus members is electrically connected to said first branch bus proximate said first pair of electrical bus members; wherein said fifth pair of electrical bus members is electrically connected to said second branch bus proximate said second pair of electrical bus members; and wherein said sixth pair of electrical bus members is electrically connected to said third branch bus proximate said third pair of electrical bus members.

10. The electrical bus assembly of claim 9 wherein said first pair of electrical bus members is structured to extend from said first branch bus toward the second side of said electrical enclosure; wherein said second pair of electrical bus members is structured to extend from said second branch bus toward the second side of said electrical enclosure; wherein said second pair of electrical bus members is disposed between said first pair of electrical bus members and said third pair of electrical bus members; wherein said third pair of electrical bus members is structured to extend from said third branch bus toward the second side of said electrical enclosure; wherein said third pair of electrical bus members is structured to be disposed between the second side of said electrical enclosure and said second pair of electrical bus members; wherein said fourth pair of electrical bus members is structured to extend from said first branch bus toward the first side of said electrical enclosure; wherein the fifth pair of electrical bus members is structured to extend from said second branch bus toward the first side of said electrical enclosure; wherein said fifth pair of electrical bus members is disposed between said fourth pair of electrical bus members and said sixth pair of electrical bus members; wherein said sixth pair of electrical bus members is structured to extend from said third branch bus toward the first side of said electrical enclosure; and wherein the sixth pair of electrical bus members is structured to be disposed between the first side of said electrical enclosure and said fifth pair of electrical bus members.

11. An electrical enclosure comprising:
a first end;
a second end disposed opposite and distal from the first end;
a first side;
a second side disposed opposite and distal from the first side;
a number of cells;
a plurality of electrical switching apparatus disposed in said number of cells;
a primary circuit including a plurality of primary electrical buses, said primary electrical buses being electrically connected to said electrical switching apparatus; and
an electrical bus assembly comprising:
a single branch circuit comprising a plurality of branch circuit buses, each of said branch circuit buses extending from a corresponding one of said primary electrical buses of said primary circuit at or about the first end of said electrical enclosure toward the second end of said electrical enclosure,
a plurality of first electrical bus members, each of said first electrical bus members including a first end and a second end, the first end of said each of said first electrical bus members being electrically connected to a corresponding one of said branch circuit buses, the second end of said each of said first electrical bus members being electrically connected to a first one of said electrical switching apparatus,
a plurality of second electrical bus members, each of said second electrical bus members including a first end and a second end, the first end of said each of said second electrical bus members being electrically connected to a corresponding one of said branch circuit buses, the second end of said each of said second electrical bus members being electrically connected to a second one of said electrical switching apparatus,
wherein said single branch circuit provides electrical power to said first one of said electrical switching apparatus and said second one of said switching apparatus,
wherein said first electrical bus members extend in a first lateral direction with respect to said branch circuit buses and said second electrical bus members extend in a second lateral direction with respect to said branch circuit buses,
wherein said first lateral direction of said first electrical bus members is generally opposite from said second lateral direction of said second electrical bus members, and
wherein said first one of said electrical switching apparatus is disposed horizontally adjacent to said second one of said electrical switching apparatus within a corresponding one of said number of cells of said electrical enclosure.

12. The electrical enclosure of claim 11 wherein said plurality of branch circuit buses of said single branch circuit is a first branch bus, a second branch bus, and a third branch bus; wherein said plurality of first electrical bus members is a first pair of electrical bus members, a second pair of electrical bus members, and a third pair of electrical bus members; and wherein said plurality of second electrical bus members is a fourth pair of electrical bus members, a fifth pair of electrical bus members, and a sixth pair of electrical bus members.

13. The electrical enclosure of claim 12 wherein each electrical bus member of said plurality of first electrical bus members and said plurality of second electrical bus members has a first end, a second end, and an intermediate portion therebetween; wherein said intermediate portion includes a first bend in a first direction and a second bend in a second direction; and wherein said first direction of said first bend is opposite said second direction of said second bend in order that said intermediate portion is substantially perpendicular with respect to the first end of said each electrical bus member and the second end of said each electrical bus member.

14. The electrical enclosure of claim 13 wherein said intermediate portion of each electrical bus member of said first pair of electrical bus members extends substantially horizontally with respect to said plurality of branch circuit buses and overlays at least a portion of said second pair of electrical bus members; wherein said intermediate portion of each electrical bus member of said second pair of electrical bus members extends substantially horizontally with respect to said plurality of branch circuit buses and overlays at least a portion of said third pair of electrical bus members; wherein said intermediate portion of at least one electrical bus member of said fifth pair of electrical bus members extends substantially horizontally with respect to said plurality of branch circuit buses and overlays at least a portion of said fourth pair of electrical bus members; and wherein said intermediate portion of each electrical bus member of said sixth pair of electrical bus members extends substantially horizontally with respect to said plurality of branch circuit buses and overlays at least a portion of said fifth pair of electrical bus members.

15. The electrical enclosure of claim 12 wherein said first pair of electrical bus members is electrically connected to said first branch bus; wherein said second pair of electrical bus members is electrically connected to said second branch bus; wherein said third pair of electrical bus members is electrically connected to said third branch bus; wherein said fourth pair of electrical bus members is electrically connected to said first branch bus proximate said first pair of electrical bus members; wherein said fifth pair of electrical bus members is electrically connected to said second branch bus proximate said second pair of electrical bus members; and wherein said sixth pair of electrical bus members is electrically connected to said third branch bus proximate said pair of third electrical bus members.

16. The electrical enclosure of claim 15 wherein said first pair of electrical bus members extends from said first branch bus toward the second side of said electrical enclosure; wherein said second pair of electrical bus members extends from said second branch bus toward the second side of said electrical enclosure; wherein said second pair of electrical bus members is disposed between said first pair of electrical bus members and said third pair of electrical bus members; wherein said third pair of electrical bus members extends from said third branch bus toward the second side of said electrical enclosure; wherein said third pair of electrical bus members is disposed between the second side of said electrical enclosure and said second pair of electrical bus members; wherein said fourth pair of electrical bus members extends from said first branch bus toward the first side of said electrical enclosure; wherein the fifth pair of electrical bus members extends from said second branch bus toward the first side of said electrical enclosure; wherein said fifth pair of electrical bus members is disposed between said fourth pair of electrical bus members and said sixth pair of electrical bus members; wherein said sixth pair of electrical bus members extends from said third branch bus toward the first side of said electrical enclosure; and wherein the sixth pair of electrical bus members is disposed between the first side of said electrical enclosure and said fifth pair of electrical bus members.

17. The electrical enclosure of claim 12 wherein said at least one electrical switching apparatus is a first circuit breaker and a second circuit breaker; wherein said first circuit breaker and said second circuit breaker are disposed side-by-side in said corresponding one of said number of cells of said electrical enclosure; and wherein said plurality of electrical bus members is a first plurality of stabs electrically connectable to said first circuit breaker and a second plurality of stabs electrically connectable to said second circuit breaker.

18. The electrical enclosure of claim 12 wherein said electrical enclosure includes a first horizontal plane and a second horizontal plane; wherein said first pair of electrical bus members, said second pair of electrical bus members, and said third pair of electrical bus members are disposed in said first horizontal plane; and wherein said fourth pair of electrical bus members, said fifth pair of electrical bus members, and said sixth pair of electrical bus members are disposed in said second horizontal plane.

19. The electrical enclosure of claim 11 wherein said corresponding one of said cells of said electrical enclosure has a width of about 22 inches; and wherein said electrical bus assembly has a width of less than 22 inches.

* * * * *